Dec. 4, 1945.   J. T. HAYWARD   2,390,252
APPARATUS FOR DETERMINING PERMEABILITIES OF POROUS MEDIA
Filed Dec. 29, 1941

INVENTOR.
JOHN T. HAYWARD
BY
ATTORNEYS.

Patented Dec. 4, 1945

2,390,252

UNITED STATES PATENT OFFICE 2,390,252

APPARATUS FOR DETERMINING PERMEABILITIES OF POROUS MEDIA

John T. Hayward, Tulsa, Okla.

Application December 29, 1941, Serial No. 424,815

3 Claims. (Cl. 73—38)

This invention relates to the determination of permeabilities of porous media, particularly of fluid-bearing rocks, such as earth strata which are normally traversed by drills in search of oil, gas or water.

Permeability is an important property of fluid bearing rocks, since it is the property that determines the rate of flow of the fluid through the rock, and hence the productivity of an oil, gas or water well drilled into the rock.

The permeability constant, usually referred to simply as "permeability" of a porous medium, such as an earth formation sample, may be defined in general as, "The volume of the fluid of unit viscosity passing through a unit cross section of the medium in unit time under the action of a unit pressure grade." In terms of the commonly accepted "darcy," this may be expressed by the relation:

$$K = \frac{2QL\mu}{A(P_1^2 - P_2^2)}$$

Where K is permeability (darcys); Q is rate of flow (ml. per sec. at mean pressure); $\mu$ is viscosity (centipoises); L is length (cm.); A is area (sq. cm.); $P_1$ is entrance pressure and $P_2$ exit pressure (in atmospheres).

Darcy's law is only valid at rates of flow of fluid through the sample in the laminar or streamline range. If the rate of flow of the fluid exceeds a certain value, i. e. a Reynolds number of above about 2000, the flow becomes turbulent and the formula does not apply. When making permeability determinations, therefore, precautions are necessary to make sure that the flow has not entered the turbulent region.

For various reasons, air normally is used in practice to determine the permeability of formation samples. According to the methods heretofore in use, air is passed through the sample of which the permeability is desired. An examination of the formula will show that it is necessary, when determining the permeability experimentally by flowing a gas through the sample, to measure the rate of the flow of the gas, its temperature, the absolute pressure on the upstream end of the sample and the absolute pressure on the downstream end of the sample. The mean pressure along the sample must then be calculated from the observed upstream and downstream pressure. The viscosity and density of the air must be determined from known data and the observed temperatures and pressures. The air or gas used must also be carefully dried.

It will be seen, therefore, that the determination of the porosity of a sample, by the methods heretofore employed involves a laborious experimental procedure, together with considerable calculation.

The principal object of the present invention is the provision of an apparatus for determining permeabilities of porous media, which is of relatively simple construction and permits of direct reading of the permeability values of said media.

The mode of operation of my device comprises flowing a fluid, which may be either gaseous or liquid, through a sample of the porous medium to be tested and through a "variable permeance" (as hereinafter defined and described) of predetermined permeability values, under equal or equivalent flow conditions of temperature, pressure drop, and rate of flow, and reading the permeance value of the permeance as an index of the permeability of the sample.

For the purposes of this description a "permeance" is defined as a passage through which the rate of flow of a fluid varies directly as the pressure drop across the passage. To meet this condition, the design of the passage must be such that the flow of fluid therethrough is constrained to be laminar or non-turbulent, i. e., having a Reynolds number below about 2000-2200.

A "variable permeance" is a permeance through which the resistance to flow of a fluid may be varied.

This invention may be performed in a number of ways all of which will effectively eliminate the many and relatively complicated calculations required by methods heretofore in use. In one embodiment, air, or other fluid, is caused to flow through the sample of the porous medium, and constant conditions of pressure drop and rate of flow therethrough are established. A variable permeance may then be substituted in the same apparatus system for the sample and the flow of fluid directed therethrough. The permeance is then adjusted until the same or equivalent flow conditions are established. The permeability value of the permeance is then read from a suitably calibrated scale and this value will be the permeability of the sample or a direct index thereof. In this embodiment precautions must be exercised to assure that the fluid during both parts of the comparative tests is at the same temperature, humidity, viscosity, etc.

In another embodiment, the necessity for these latter precautions may be eliminated by simultaneously flowing streams of air or other fluid from a common source through both the sample and the permeance and adjusting the permeance until the pressure drop and volume therethrough is equal to, or bears a fixed relation to, the same conditions established for the stream flowing through the sample. Since the fluid is supplied in simultaneously flowing streams from a common source, the temperature, viscosity, and other conditions will, therefore, be the same in both streams.

However, the determination of permeability may be even further simplified in accordance with a preferred embodiment of this invention which utilizes the principle of the Wheatstone bridge, in which a flow of air or other suitable fluid, rather than of electric current, is employed for testing purposes. With such an apparatus, the sample of porous medium is interposed in one arm of the bridge. The variable permeance is interposed in another arm of the bridge, and in the other arms of the bridge are inserted permeances of fixed value. These permeances when installed in a Wheatstone arrangement constitute flow resistors, analogous in their arrangement and function to variable and fixed value electrical resistance, employed in conventional electrical bridges for determining the resistance of an unknown electrical element, the permeances of the present invention being employed in an analogous manner to determine the permeability of the unknown porous medium.

When air, or other fluid, is caused to flow through the two sides of the bridge, the permeability of the sample may be determined by bringing the pressures in the two sides of the bridge to balance or equality by suitable adjustment of the variable permeance and by reading directly on a suitably calibrated scale, the permeability value of the variable permeance which will, in turn, give directly the permeability value of the sample. The scale is ordinarily calibrated in units corresponding to darcys or millidarcys, which are the commonly accepted units for expressing the permeability constant, i. e. the "permeability" of the sample.

Various other objects and advantages of this invention will become apparent from the following detailed description when read in conjunction with the accompanying drawing which illustrates useful embodiments of apparatus for successfully conducting the method in accordance with this invention.

Figure 1:
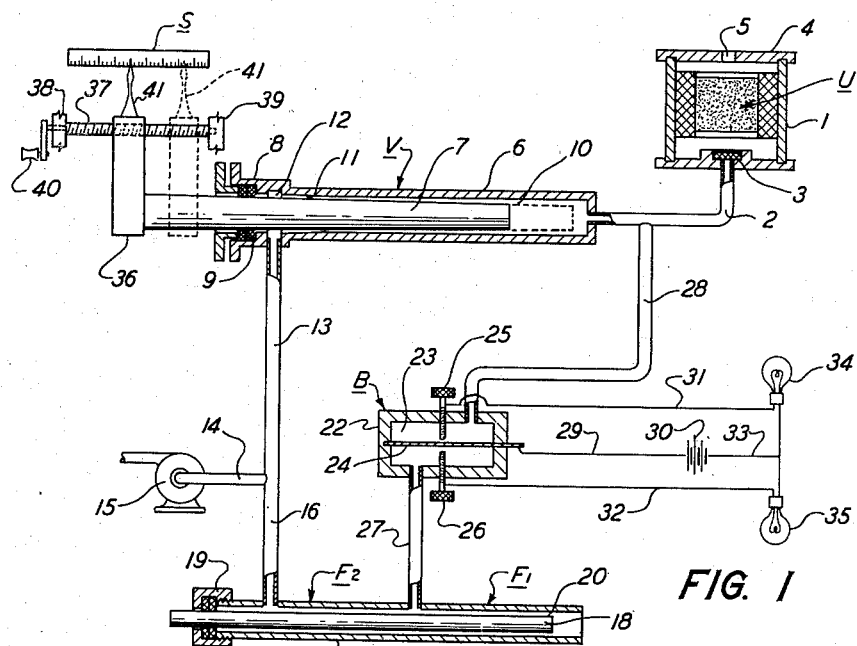
Fig. 1 illustrates an assembly of apparatus employed to determine permeabilities of porous media, in accordance with a preferred embodiment of this invention.
Figure 2:
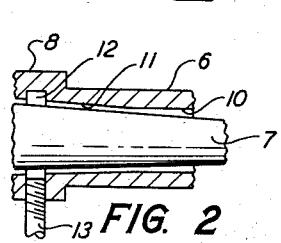
Fig. 2 is an enlarged detail of a portion of the apparatus illustrated in Fig. 1.

Referring to Fig. 1, the apparatus consists of a hollow sample holder 1 into the closed bottom of which is connected one end of a pipe 2 over which is placed a screening mat 3, composed of any suitable screening or filtering material to prevent entrance of solid particles into pipe 2. The top of holder 1 is closed by a cover 4 which has an opening 5 therein. The other end of pipe 2 is connected into the closed end of a cylindrical casing 6 which forms the body of a variable permeance, designated generally by the letter V. A tapered plunger 7 extends into the opposite end of casing 6 and is movable longitudinally therein. A stuffing box 8 is mounted on the outer end of casing 6 and packing 9 is interposed between the plunger 7 and the outer end of casing 6 to provide a fluid tight seal between these members while permitting plunger 7 to be reciprocated in casing 6.

The taper of plunger 7 is normally very slight, being exaggerated in the drawing for purposes of illustration. The taper is such that the dimensions of the annular passage 10 thus provided between the plunger and casing 6 will be effective to produce substantially only laminar or non-turbulent flow of gaseous fluid therethrough at the pressures employed that is, the passage 10 will have a Reynolds number of less than 2000–2200. To assure laminar flow of the gaseous fluid throughout the working range of plunger 7, particularly in that portion of the range approaching the fully inserted position of plunger 7, when the area of passage 10 becomes quite small as compared to its length, a section 11 of the inner wall of casing 6, adjacent its outlet end, is preferably machined to the same taper as that of the plunger (see Fig. 3). This also serves to increase the accuracy of the apparatus. With this arrangement of tapered plunger 7 in casing 6, the resistance to the flow of fluid passing through passageway 10 under laminar flow conditions may be varied, thereby changing the permeability of the passageway.

An annular chamber 12 is interposed between the outer end of casing 6 and stuffing box 8 and communicates with annular passage 10. A pipe 13 connects at one end into chamber 12 and at the other to the suction pipe 14 of a gas pump 15. An extension 16 of pipe 13 connects into an elongated tubular cylinder 17, adjacent one end thereof. Cylinder 17 forms the common casing for a pair of fixed value permeances, designated generally by the letters $F_1$ and $F_2$.

A cylindrical plunger 18 is disposed in the bore of cylinder 17, and extends from the end thereof adjacent that to which extension pipe 16 is connected. A stuffing box 19 provides a fluid-tight seal between the plunger 18 and the end of cylinder 17 from which the plunger extends. The opposite end of cylinder 17 is open to the atmosphere. Plunger 18 is slightly smaller in diameter than the bore of cylinder 17 to provide an annular passage 20, the dimensions of which are effective to produce substantially only laminar flow of gaseous fluid therethrough under the pressures employed and, therefore, will have a Reynolds number of less than 2000–2200.

A pressure balance indicator, designated generally by the letter B, consists of a fluidtight housing 22 enclosing a chamber 23 which is equally partitioned, transversely, by a metal diaphragm 24 the edges of which are tightly sealed into the walls of housing 22. Contact screws 25 and 26 extend through opposite side walls of housing 22 and have their inner ends adjustably positioned closely adjacent diaphragm 24 and on opposite sides thereof. A pipe 27 provides communication between the chamber 23 on one side of diaphragm 24 and an intermediate portion of passage 20 in cylinder 17, and a pipe 28 provides communication between the portion of chamber 23 on the opposite side of a diaphragm 24 and a point in pipe 2 intermediate sample holder 1 and variable flow resistor V. The portions of cylinder 17 and plunger 18 extending between the points of connection into cylinder 17 of extension pipe 16 and pipe 27 constitute the fixed value permeance $F_2$ and the portions of cylinder 17 and plunger 18 extending on the opposite side of pipe 27 constitute the fixed value permeance $F_1$.

Contact screws 25 and 26 are connected with diaphragm 24 in an electric circuit which includes a conductor 29 connecting diaphragm 24 to one side of a battery 30, or other suitable source of electric current, and a pair of conductors 31 and 32 which connect contact screws 25 and 26, respectively, to the other side of battery 30 through a common conductor 33. Electric lamps 34 and 35 are connected into conductors 31 and 32, respectively. Contact screws 25 and 26 are adjusted until their ends are close to the adjacent sides of diaphragm 24. When the pressure in chamber 23 on one side of the diaphragm is greater than on the other, the diaphragm is forced toward the side having the lesser pressure and makes contact with the contact screw on that side, closing the circuit and causing the lamp on that side to light up. When the pressures on both sides of diaphragm 24 are balanced neither lamp will be lighted and this condition indicates to the operator that the pressure is balanced. It will be understood that any other suitable or conventional pressure balance indicator may be substituted for the form herein described without in any way departing from the essential features of this invention.

The outer end of plunger 7 has rigidly attached thereto a cross-head 36, which is adapted to be driven by a screw shaft 37 journalled in brackets 38 and 39 and rotatable by a handle 40. Rotation of shaft 37 by means of handle 40 produces longitudinal movement of cross-head 36 along shaft 37 in a direction depending upon the direction of rotation of the shaft and also produces corresponding movement of plunger 7 within casing 6, thereby accordingly increasing or decreasing the resistance of the fluid flowing through annular passage 10. Cross-head 36 carries a pointer 41 which is adapted to move along a scale S in accordance with the movement of cross-head 36 and plunger 7. Scale S is calibrated in any suitable units designating permeability values, normally in darcys or millidarcys, that is, the changes in longitudinal position of plunger 7 in casing 6 and therefore of the permeability value of annular passage 10, corresponding thereto, are converted into permeability units in the calibrations of scale S.

The apparatus illustrated in Fig. 1 is operated in the following manner: A cylindrical core U, normally cut from an earth formation is placed in core holder 1 and is tightly sealed therein by a suitable sealing means 36 which may be sealing wax or a rubber ring. The sealing means is so arranged about core U as to effectively constrain all fluid entering the top of core holder 1 to pass through core U. Cover 4 is then placed over the top of core holder 1, and air from the atmosphere is drawn through opening 5 into the core holder and through core U, by suction from pump 15. The air passing through core U then flows through pipe 2 into the interior of casing 6 of the variable permeance V and thence through passage 10 into chamber 12 and thence into pipe 13, from which it is drawn through suction pipe 14 into pump 15 which discharges the air to the atmosphere.

Simultaneously, pump 15 draws a current of air from the atmosphere through the open end of cylinder 17, through passage 20 and extension pipe 16 into suction pipe 14 and also discharges this air to the atmosphere. Plunger 18 is adjusted longitudinally in cylinder 17 until the permeability values of permeances $F_1$ and $F_2$ have a definite relationship to each other. The adjustment may be such as to make the values of $F_1$ and $F_2$ equal or of any other definite relative value. Having established a definite relationship between permeances $F_1$ and $F_2$ stuffing box 19 is tightened to fix the position of plunger 18 and to thereby maintain this relationship either permanently or throughout any desired number of determinations.

Plunger 7 is then moved in and out of casing 6 by turning handle 40 until the pressure in pipe 2 between core holder 1 and variable permeance V is equal to that existing between fixed value permeances $F_1$ and $F_2$, this condition being indicated when both lamps 34 and 35 are extinguished. At this point, the reading of scale S opposite the position of pointer 41 will give directly the permeability value of sample U.

From the foregoing it will be seen that the permeability values of porous media may be determined quickly in a greatly simplified and direct manner. Since the air is supplied to core holder 1 and cylinder 17 simultaneously from a common source, namely the atmosphere, all variable conditions, such as temperature, viscosity, humidity and upstream pressures will be identical at these points of entry to the apparatus.

For the sake of convenience in standardizing the units of scale S, the samples U which are placed in core holder 1 are preferably of standard dimensions, for example, 2 cm. in diameter and 2 cm. in length. Any other size sample may be used, however, and the permeability value thereof determined by applying a suitable correction factor to the reading of scale S corresponding to the dimensional relationship between the unknown sample and a sample of standard size.

Variable permeance V and fixed value permeances $F_1$ and $F_2$ may be of any suitable form. The forms shown and described herein being found to be of a relatively simple and convenient design which has now been successfully used in commercial practice. In the commercial form of variable permeance V, casing 6 has a length of 12 inches and plunger 7 has a stroke of 11 inches. The clearance between plunger 7 and casing 6 varies from zero at the large end when fully inserted, to 0.004 inch at the small end. These dimensions are given by way of example only, and may be, of course, varied, the critical limits being only such as to constrain laminar flow of the fluid in passage 10. That is, passage 10 under operating flow conditions must have a Reynolds number of less than about 2000–2200.

Figure 3:
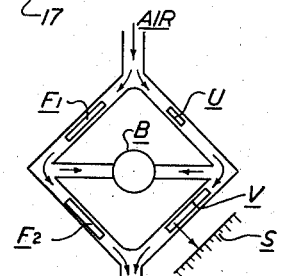
Figs. 3 and 4 are schematic views illustrating two Wheatstone bridge arrangements employed in accordance with an embodiment of this arrangement.

Fig. 3 schematically illustrates the characteristic Wheatstone bridge arrangement employed in the arrangement of the apparatus shown in greater detail in Fig. 1. The identifying letters applied to the essential elements of Fig. 1 are shown applied to the corresponding elements in the bridge arrangement shown in Fig. 3.

Figure 4:
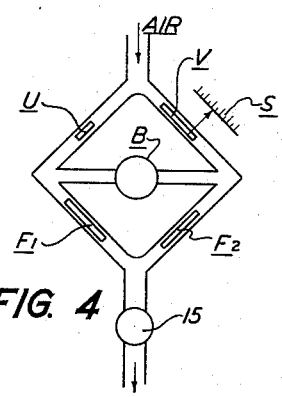

Fig. 4 schematically illustrates another characteristic Wheatstone arrangement for the elements of Fig. 1 which is fully equivalent in operation and efficiency to the earlier described forms. Various other Wheatstone or equivalent arrangements may be employed, as desired, without departing from the principles of this invention.

Figure 5:
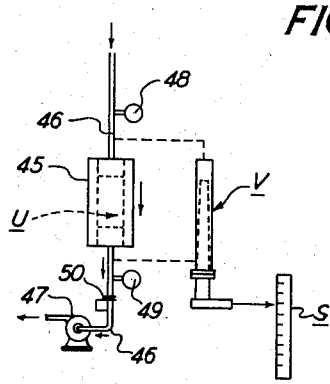
Figs. 5 and 6 illustrate schematically apparatus arrangements employed in additional embodiments of this invention.

Fig. 5 illustrates another embodiment of this invention wherein the permeability of an unknown sample of porous medium is compared with a variable permeance in order to establish the permeability of the unknown sample. In Fig. 5 a core holder 45, similar in form to core holder 1, is interposed in a conduit 46 through which air from the atmosphere is drawn by means of a pump 47. A core sample U is installed in the core holder 45 in the manner previously described. A pressure gage 48 is connected into conduit 46 on the up-stream side of coreholder 45 and a second pressure gage 49 is connected into conduit 45 on the down-stream side of the core holder. A flow meter 50 is also connected into conduit 45 between gage 49 and pump 47. The flow of air through conduit 46 and core holder 45 is adjusted until a constant rate of flow of air is established through sample U, as determined by means of meter 50. Pressure gages 48 and 49 will then show corresponding constant readings and constant flow conditions through sample U will then be established. Variable permeance V will then be substituted in the pneumatic circuit for core holder 45 and adjusted until the readings of pressure gages 48 and 49 and of meter 50 are equal to, or bear some other suitable equivalent relationship to those obtaining with sample U. The permeability value of variable permeance V can then be read directly from scale S as an index of the permeability of the sample U.

In conducting this determination by direct comparison between a variable permeance of known permeability values and the unknown sample, precautions must be exercised to assure that the temperature, viscosity, and humidity conditions of the air remain constant during passage both through the sample and through the permeance.

Figure 6:
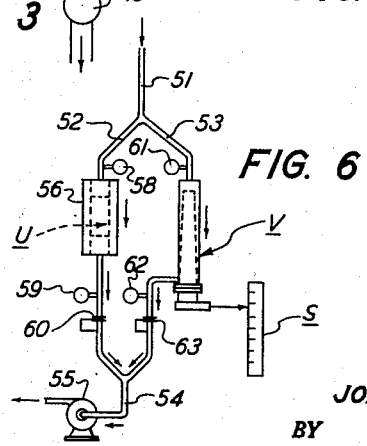

Fig. 6 illustrates a modified form of the apparatus illustrated in Fig. 5 for making similar comparison between the sample and the permeance, but by which the precautions as to temperature, viscosity, and humidity may be avoided. In this embodiment, a conduit 51 supplies the air or other fluid to the system and is connected with a pair of branch conduits 52 and 53, which are rejoined into a single conduit 54 connected to the section of a pump 55 which draws the fluid through the system. In branch conduit 52, a core holder 56 containing a core sample U is interposed. Pressure gages 58 and 59 are connected into conduit 52 on the up-stream and down-stream sides of core holder 56, and a flow meter 60 is interposed in branch conduit 52 between pressure gage 59 and the junction of conduit 52 with conduit 54. A variable permeance V, of the form and character previously described, is interposed in branch conduit 53 which also has up-stream and down-stream pressure gages 61 and 62, respectively, and a flow meter 63, arranged in the same relative locations as the corresponding instruments in branch conduit 52.

In employing the apparatus of Fig. 6, pump 55 draws air from the atmosphere through conduits 51, from which parallel streams flow simultaneously through branch conduits 52 and 53 and through core U and variable permeance V. When flow conditions in branch conduit 52 have become constant, variable permeance V will be adjusted until duplicate or equivalent flow conditions are established in branch conduit 53, whereupon the reading indicated on scale S will give the permeability value of core sample U. Since both streams of air are drawn simultaneously from a common source, the atmosphere, the effect of temperature, viscosity, humidity, and other variable conditions of the air will be the same in both branch conduits, and may be neglected.

It will be understood that while air is preferred as the testing fluid in making the permeability determinations, other gaseous fluids and liquids may be employed advantageously for this purpose. Also, while it is preferred to draw the fluid through the apparatus, this is also a matter of convenience, and in some cases it may be advantageous to flow the fluid through the apparatus under a positive pressure, it being necessary only that such positive pressures do not exceed a pressure which would increase the Reynolds number of the permeances above the maximum of 2000–2200, that is, which would not cause turbulent flow of the fluid in the permeances.

It will be understood that various alterations and modifications may be made in the apparatus details and in the details of the method of this invention without departing from the scope of the appended claims, but within the spirit of this invention.

What I claim and desire to secure by Letters Patent is:

1. In apparatus for determining the permeability of a porous medium, a variable permeance comprising, an elongated tubular body having a fluid inlet at one end and a fluid outlet adjacent the opposite end, a tapered plunger reciprocable in the bore of said body through said opposite end, the clearance between the plunger and body being such as to define a fluid passage constraining laminar flow of the fluid therethrough, sealing means mounted in said opposite end of said body enclosing said plunger, means connected with the outer end of said plunger for reciprocating same within said body and having associated therewith means for indicating the longitudinal position of said plunger relative to said body.

2. In apparatus for determining the permeability of porous media a permeance comprising, an elongated tubular body having a fluid inlet at one end thereof, an elongated cylindrical plunger extending into said body through the opposite end thereof and adjustable longitudinally therein, the degree of clearance between said plunger and said body being such as to define a fluid passage having a Reynolds number of less than 2000–2200, and a plurality of fluid outlets communicating with said passage at longitudinally spaced points to divide said passage into a plurality of passages the relative permeability values of which are proportional to their relative lengths.

3. Apparatus for determining the permeability of a porous medium comprising, a pair of fluid conduits connected to a common source of fluid supply and arranged in a bridge structure having the Wheatstone arrangement, each of said conduits comprising one side of said bridge structure, the first of said conduits including a pair of adjacent arms designated as a first arm and a second arm and the second of said conduits including a pair of adjacent arms designated as a third arm and a fourth arm, a pressure balancing conduit connecting the two sides of the bridge at points intermediate each pair of adjacent arms, pressure balance indicating means operatively associated with said pressure balancing conduit, said first and second arms consisting of a single elongated tubular body having a fluid inlet at one end thereof, a fluid outlet at the opposite end thereof, and an opening intermediate the ends thereof communicating with said pressure balancing conduit, a plunger extending into said tubular body through one end thereof, the degree of clearance between said plunger and said body being such as to define a restricted fluid passageway to thus provide a first permeance in said first arm and a second permeance in said second arm, means for interposing a porous medium in said third arm, said fourth arm comprising an elongated tubular member having a fluid inlet at one end and a fluid outlet adjacent the opposite end, a tapered plunger reciprocable in the bore of said body through said opposite end, the clearance between said tapered plunger and said body being such as to define a fluid passage, means for reciprocating said tapered plunger within said body to vary the permeance of the fluid passage, an index associated with said tapered plunger for indicating the longitudinal position of said tapered plunger relative to said tubular body, and means for causing fluid to flow from said source simultaneously through said pair of conduits.

JOHN T. HAYWARD.